US010218720B2

(12) United States Patent
Smith et al.

(10) Patent No.: US 10,218,720 B2
(45) Date of Patent: *Feb. 26, 2019

(54) DYNAMIC CONFIGURATION OF SETTINGS IN RESPONSE TO DDOS ATTACK

(71) Applicant: LEVEL 3 COMMUNICATIONS, LLC, Broomfield, CO (US)

(72) Inventors: Robert Smith, Irvine, CA (US); Shawn Marck, San Francisco, CA (US)

(73) Assignee: Level 3 Communications, LLC, Broomfield, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/651,777

(22) Filed: Jul. 17, 2017

(65) Prior Publication Data
US 2017/0318042 A1 Nov. 2, 2017

Related U.S. Application Data

(63) Continuation of application No. 14/852,517, filed on Sep. 12, 2015, now Pat. No. 9,712,546.

(60) Provisional application No. 62/050,056, filed on Sep. 12, 2014.

(51) Int. Cl.
H04L 29/06 (2006.01)
H04W 80/06 (2009.01)
H04L 12/00 (2006.01)
H04L 12/64 (2006.01)

(52) U.S. Cl.
CPC .......... H04L 63/1416 (2013.01); H04L 12/00 (2013.01); H04L 12/6418 (2013.01); H04L 63/1458 (2013.01); H04W 80/06 (2013.01)

(58) Field of Classification Search
CPC . H04L 63/1416; H04L 63/1458; H04L 63/20; H04L 29/08144; G06F 21/60; G06F 21/62; G06F 21/604
USPC ................ 726/23, 27–30; 709/225–226, 229
See application file for complete search history.

(56) References Cited

U.S. PATENT DOCUMENTS

| 6,985,937 | B1 | 1/2006 | Keshav |
| 7,028,298 | B1 | 4/2006 | Foote |
| 7,463,590 | B2 * | 12/2008 | Mualem ............... H04L 63/1458 370/241 |
| 7,725,760 | B2 * | 5/2010 | Rowan ................ G06F 11/1435 700/28 |
| 8,489,673 | B2 * | 7/2013 | Sebastian ............ H04L 12/1859 709/203 |
| 8,800,039 | B2 * | 8/2014 | Yoon ..................... G06F 21/554 713/188 |
| 8,996,701 | B2 | 3/2015 | Tameshige |
| 9,088,605 | B2 * | 7/2015 | Carpenter .......... H04L 63/1441 |
| 9,436,710 | B2 | 9/2016 | Shoolman |
| 9,712,546 | B2 * | 7/2017 | Smith ................ H04L 63/1416 |
| 2016/0080402 | A1 | 3/2016 | Smith et al. |

* cited by examiner

Primary Examiner — Hosuk Song

(57) ABSTRACT

A system can monitor the server for indications of an attack and adjusts server settings accordingly. In response, the system can increase server tolerance in a systematic way to deal with DDoS by adjusting server settings appropriately. Conversely, when the server is not under attack, the settings can be adjusted to those for standard operations (e.g., adjusted downward), as they are more optimal for normal, non-attack operations.

17 Claims, 2 Drawing Sheets

110 — Monitor client requests made to the server

120 — Determine a first amount of a first resource of the first set that is currently being used to respond to the client requests

130 — Compare the first amount to a first threshold

140 — Increase a value of the first resource setting in response to the first amount being larger than the first threshold

FIG. 1

DYNAMIC CONFIGURATION OF SETTINGS IN RESPONSE TO DDOS ATTACK

RELATED APPLICATIONS

This non-provisional application is a continuation of and claims the benefit of priority to co-pending U.S. patent application Ser. No. 14/852,517, filed Sep. 12, 2015, titled "DYNAMIC CONFIGURATION OF SETTINGS IN RESPONSE TO DDOS ATTACK," the entire contents of which are fully incorporated by reference herein for all purposes. Application Ser. No. 14/852,517 claims the benefit of priority to U.S. Provisional Patent Application No. 62/050,056, filed Sep. 12, 2014, titled "DYNAMIC CONFIGURATION OF SETTINGS IN RESPONSE TO DDOS ATTACK," the entire contents of which are fully incorporated by reference herein for all purposes.

BACKGROUND

In a distributed network like the Internet, different computers and computer networks may be virtually connected and accessible via various routes. When a computer server is under attack, e.g., a distributed denial of service (DDoS) attack, responses to the attack must be made in order to maintain the associated computer network's accessibility to other networks and computers. When such attacks occur, a large percentage of a server's resources get used up, and the default server settings are not adequate to absorb the attack, which can hurt mitigation efforts to keep the server up and increase recovery time.

Embodiments of the invention address these and other problems, individually and collectively.

BRIEF SUMMARY

Techniques are provided for automatically adjusting settings of a server in response to a distributed denial of service (DDoS) attack. For example, transport layer settings (e.g., TCP settings) can be adjusted automatically. Although specific examples discuss adjusting TCP settings (also referred to as TCP hardening), embodiment are applicable to other settings (also called parameters) in response to an attack.

Embodiments (e.g., TCP hardening) can increase the availability of a server's TCP layer to new connections during a Layer 4 (i.e. the transportation layer) DDoS attack. TCP Hardening techniques can be effective in maintaining the connectivity of a server under an OSI Level 4 attack, such as a SYN flood, where an attacker sends a succession of SYN requests to a target server in an attempt to consume enough resources to make the server unresponsive to legitimate traffic. A system can monitor the server for indications of an attack and adjusts server settings accordingly. In response, the system can increase server tolerance in a systematic way to deal with DDoS by adjusting server settings appropriately. Conversely, when the server is not under attack, the settings can be adjusted to those for standard operations (e.g., adjusted downward), as they are more optimal for normal, non-attack operations.

Other embodiments are directed to systems, portable consumer devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 1 is a flowchart showing polling system state and updating server parameters.

DETAILED DESCRIPTION

Figure 2:
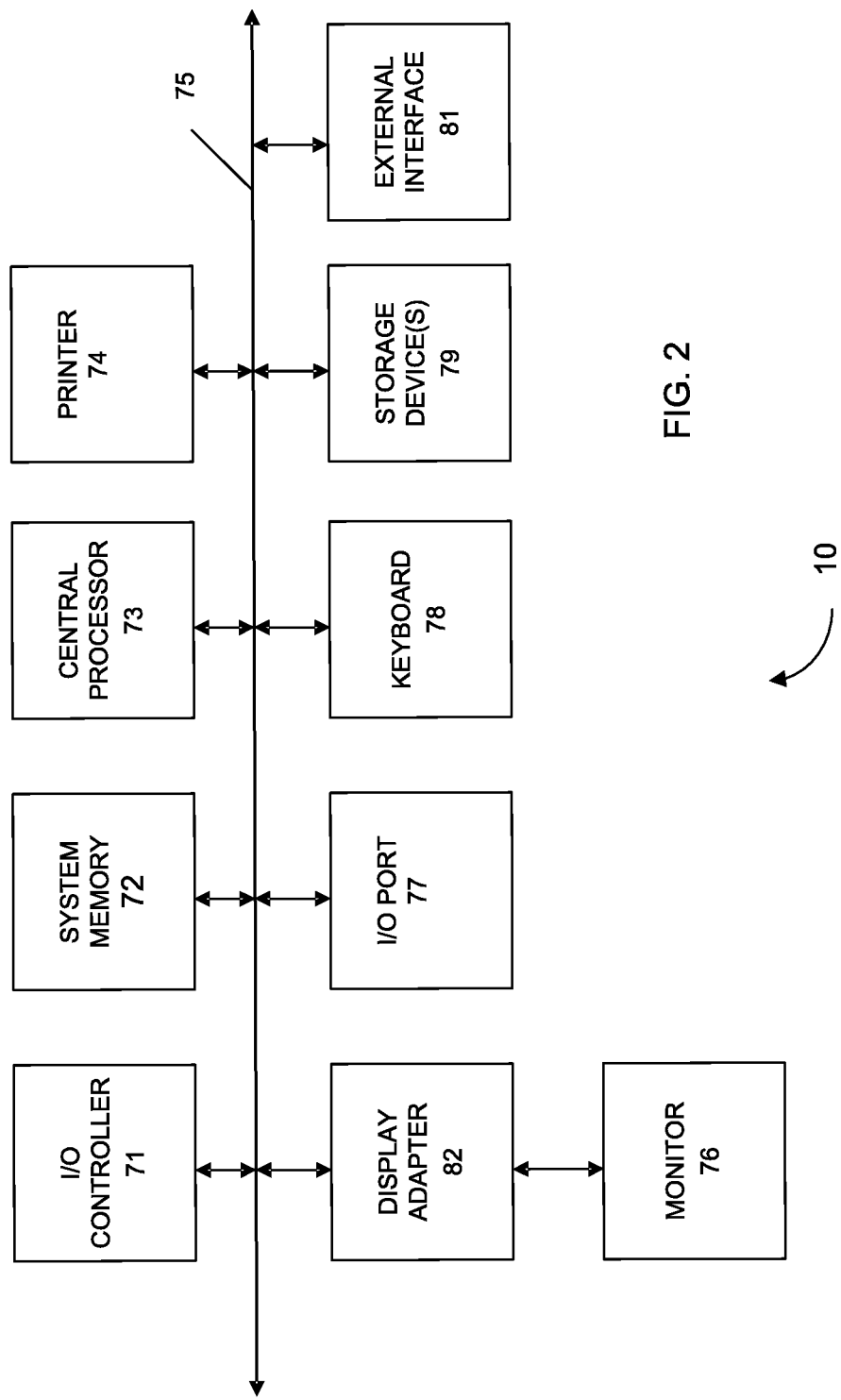
FIG. 2 shows a block diagram of an example computer system usable with system and methods according to embodiments of the present invention.

When a DDoS attack occurs, a server can be overwhelmed. Embodiments can automatically adjust the settings in response to the attack, e.g., increase or decrease a setting when an attack is occurring and increase or decrease the setting when there is not attack.

I. Transport Layer Attacks

The Internet is a collection of connected machines. Generally, each machine on the Internet can be categorized as one of two types, either a server or a client. Those machines that provide services (e.g., those that are used to host a website for other machines to connect to) are considered servers. Client machines are those are the machines that are used to connect to those services are clients. If a server is under a DDoS attack, then it may not be available for the desired client machines to connect to, and cannot serve its purpose.

Communication over the Internet is often described with respect to the Open Systems Interconnection model (OSI), as is known to one skilled in the art. Although embodiments are not limited to the OSI model, discussions below may refer to the OSI model for ease of discussion. Common transport layer protocols are TCP (transport control protocol) and UDP (user datagram protocol).

A goal of a Layer 4 attack is to fill up the session (or connection) table. Servers have a connection table that tracks sessions, and when all of the connections that are allocated are exhausted, the server cannot open any more sessions to clients, effectively denying access to the server to legitimate clients. This means any incoming requests will be blocked, thus, denying service to clients.

A SYN flood is a type of Layer 4 DDoS attack where an attacker or group of attackers send a large succession of SYN requests to a server in an attempt to overwhelm the server, which if not properly configured can limit the server's ability to properly respond to incoming requests. The attack works because the attackers will not respond properly to the server's response, thus keeping open a connection and consuming memory, until it the connection times out, and is closed.

When such attacks occur, a lot of the server's resources get used up responding to the attacks, and the default settings of the server are not adequate to absorb the attack. This hurts mitigation efforts to keep the service up. Embodiments can increase server tolerance in a systematic way to deal with these DDoS attacks.

II. Default Server Operation and Settings

The default settings on servers (e.g., Linux-based servers) are not optimized to handle the strain of DDoS attacks. For example, the number of connections is set an order of magnitude lower than is advised during a Layer 4 DDoS attack. Consequently, the amount of memory set aside to handle these connections is inadequate as well. The default settings are set for normal operations. Developers tend to overlook DDoS when trying to figure out the best way to manage a system's network settings. In many cases, server operators simply setup the servers, which are then forgotten about. Although one can manually change the settings from their default state, this is done infrequently (if ever), and such changes may not be done correctly.

Ultimately, the server operator suffers because they are not able to benefit from what is best for the server at all times, and clients suffer not being able to connect to the server. With an increase in DDoS attacks, this practice is not adequate for maintaining a server that will continue to operate and serve its purpose optimally.

A partial list of problems with default server settings includes: hosts replying to ICMP echo requests with spoofed target source; some routers send bad ICMP frames in violation of RFC 1122; saving connection metrics in the route cache can lead to performance degradation; under duress, a system receives packets faster than the kernel can process them leading to "dropped packets;" the incoming packet queue is too small; the connection table is filled with half open connections due to a SYN flood; not enough memory to accommodate additional connections; arbitrarily picked settings might cause more problems; connections in time_wait state prevent reuse of connections; severe SYN floods can fill up the time_wait bucket; the system file descriptor limit is too low; port exhaustion is caused by too many connections to the same backend server address; a large amount of time is spent waiting for ingress connection acknowledgement; time connections remain open too long (i.e. connection timeouts); the time waiting for a connection termination request or the acknowledgement of a sent termination request is too long; time awaiting remote termination requests too long; time spent waiting on remote termination request acknowledgement too long; and time spent waiting on acknowledgement of termination request from remote too long; time spent waiting to be sure the remote host received the connection termination request too long.

Accordingly, embodiments can automatically adjust settings so that the settings are optimal for whatever the operating conditions may be. Regardless if there is light traffic, heavy traffic, or under attack, the server can be optimally, automatically configured.

Additionally, embodiments can change settings in coordination with each other. For example, the relationship between connections and memory is important but not always well understood by those trying to optimize servers to better tolerate Layer 4 DDoS attacks. There is a lot of bad information on the Internet that people use to address this problem. This results in changes to settings that leave the server vulnerable. For example, someone may increase the number of connections too high and fail to allocate enough memory to those additional connections. As another example, settings adjustments can take into account concerns about caching, as well as conflicting settings. Accordingly, embodiments can change settings in a coordinated fashion. For example, thresholds may be set so that two settings change at about the same time. In one embodiment, a decrease/increase in one setting can automatically cause a corresponding change in another setting.

III. Detection of and Response to Changing Server Conditions

FIG. 1 is a flowchart illustrating a method 100 of modifying settings of a server in response to an attack according to embodiments of the present invention. Method 100 is performed by a computer system that may include one or more computers. When performed by multiple computers, the computers are connected by a network. Method may be performed by the server, an external system, or a combination of both.

The server has a first set of resources that are used to respond to client requests. Each resource of the first set is capable of being increased and decreased. An amount of a resource available for responding to the client requests is specified by a resource setting. The first set of resources may have resource settings that are numerical value, and other resources may just be binary or a set number of classifications. Examples of such resources are provided in a following section.

At block 110, client requests made to the server are monitored. The client request can be monitored in various ways. For example, the server or another system can submit requests to identify system resources currently being used. For example, the size of a connection table can be requested.

At block 120, a first amount of a first resource of the first set that is currently being used to respond to the client requests is determined. How the first amount is determined can depend on what the first resource is. For example, the system can measure an average, median, or maximum time measured for responding to the requests. As another example, a table size may be obtained to determine the number of connections currently open.

At block 130, the first amount is compared to a first threshold. The first threshold is less than a current value of a first resource setting corresponding to the first resource. For example, the first resource setting may be a maximum allowed for the first resource, and the first threshold can be a specified percentage of the maximum.

At block 140, a value of the first resource setting can be increased in response to the first amount being larger than the first threshold. Thus, the amount of the first resource available to respond to client requests can be increased. In one embodiment, the first resource setting can be increased by a specified percentage of the current value of the first resource setting. In another embodiment, the first resource setting is increased by a specified number.

After the value of the first resource setting is increased, the first threshold can be increased. Thus, when the monitoring continues, it can be determined that the updated threshold is again surpassed by the current amount of requests, and then the first resource setting can be increased again.

As the monitoring continues, a new amount of the first resource that is currently being used to respond to the client requests can be determined. As mentioned, the new amount can continue to increase past an updated threshold, resulting in a further increase. But, the new amount can also be less than the updated threshold (or some other threshold), and then the value of the first resource setting can be decreased.

A second resource setting corresponding to a second resource can also be increased in response to the first current amount being larger than the first threshold. The second resource setting can be increased by a same amount that the first resource setting is increased.

A modification software routine (logic) can be used to make modifications to a server to address the above problems with the default settings. The modification routine can execute on any processor (or set of processors) that has access to an amount of resources currently being used by the server. For example, the system can look at the environment by having a program running in memory, constantly watching in the background and periodically analyzing the connection states of the server, and recording that data and doing statistical analysis to establish a baseline of normal operations. The normal state can vary from server to server, so the establishment of a baseline of normal operations will provide a server-specific state of normal operations for future data to be compared against.

Embodiments can give a server an opportunity to recover faster from attacks and have some resilience during an attack. For example, a TCP Hardening system can help to ensure the availability of a server's TCP layer to new connections during a transportation layer DDoS attack, and modify the server's related settings to the appropriate levels during times of normal operation. As examples, the system can employ three strategies: (1) increasing the number of sessions the server can hold, (2) increasing memory allocation on the server, and (3) reducing session timeouts so unused session resources can be allocated more quickly when the server is under attack.

The data this program receives can include the connections, the resource usage, the incoming packet rate, the peak state, and the existing connections. It can also make sure there is room for server tolerance to grow, which may be important because of the nature of DDoS attacks.

The system may have certain on/off switches that allow it to collect statistics on the closed connections in order to help automatically optimize the new connections to be opened. There may be features to disable under duress, and then re-enable when duress is over. For example, during a SYN flood attack, the creation of a bunch of illegitimate connections creates false data that could ruin the server. So, the system would want to turn off the tracking of those connections during an attack.

If the system detects abnormal behavior on the server, for example excessive connection requests, the system can provide a way to identify settings that are out of sync and start making adjustments based on observed properties, such as connection usage, the number of connection timeout states, and whether you recycle or reuse those connections.

Essentially, for every parameter that is adjusted in the server setting, the system can analyze the data related to that parameter. For example, the system adjusts the incoming and overflow buffer depending on the state of the server. The system can perform many observations of the system and make statistical calculations, including a logic tree that responds to situations where the collected data is a certain percentage above or below the expected state, then make an adjustment to the server settings. The system can allow server operators to benefit from near optimal server settings at all times, by updating the settings for optimal server performance based on server conditions.

On the server level there are several things that the system can look at to determine changed conditions. These include, but are not limited to the server load, the number of open connections, the amount of memory being used by the buffers, the incoming packet rate into the buffers. These are system variables on the server that can be examined, that lead to adjustment, upward or downward of server system parameters for the best server performance, based on the incoming data.

The system can have a series of heuristic rules to adjust the system parameters based on measurements of the server state. That is if the currently set system parameters are not adjusted correctly for the current server state, the rules would be applied to adjust them to appropriate levels. For example, if the server settings are not in line with the observed server load, number of open connections, memory usage, then readjust the server settings as appropriate. Depending on exactly where the current state of the server is, the system will choose the appropriate particular settings.

A modification routine may run on a cyclical basis of for example every second or two seconds poll the server to see if changes are needed to server parameters.

One set of rules could consist of increase the available resources up to a maximum amount if the observed values are above a threshold. Likewise, if the system has restored to a normal state after recovering from an attack, the server settings can be restored to those for normal operation. The adjustments to server settings can be proportional to the observed deviation from the expected normal state.

As an example imagine a monitoring process running and a particular monitored system parameter having a default maximum allowed value of 100,000. A rule could exist that if the observed value for this was within 80% of the maximum value, then raise the number up say another 10% or 20% to provide a slow increase to the available resources. The system would be responding to increased demand, but not excessively. Then later on, if the observed value fell down to 70% of maximum, the available resources would be reduced back down in 10% or 20% increments back down to the default level of 100,000 over a series of observations. This would decrease the server resources consumed to an appropriate level.

IV. Example Server Settings

The following are a series of examples of modifications to certain server parameters and the logic for such modifications. Many of the parameters discussed can be found on a standard Linux-based operating system in configuration files like/proc for live settings or at /etc/sysctl.conf that has settings that will persist through a server reboot/shutdown. Embodiments can modify the configuration file or files and enable the changes in the system. The modifications can be implemented by a routine executing on the server itself and/or on a separate system. In some implementations, the routine can execute most efficiently on the at-risk server.

Certain modifications are to parameters only having binary values, in that the parameters should be enabled or disabled during periods of detected attack or conversely, normal operation. Other settings can be numerical or of multiple classifications, and can be increased or decreased in response to current conditions.

As a 1st example, a setting can ignore ICMP echo requests from broadcast address prevent computer from participating is this type of attack. The system could set net.ipv4.icmp_echo_ignore_broadcasts=1 to effectuate this change.

As a 2nd example, by ignoring bad ICMP frames, the system may prevent unnecessary log entries, and decrease memory utilization during times of detected attack. The system could set net.ipv4.icmp_ignore_bogus_error_responses=1 to effectuate this change.

As a 3rd example, if tcp_no_metrics_save is enabled, TCP will not cache metrics on closing connections. Metrics are not very useful for high connection rate environments. So, by disabling metrics the system can increase the server resilience to SYN floods by saving on the overhead of tracking metrics. Additionally, DDoS attacks would cause false metrics to be generated since DDoS based connections are not legitimate. Systems not under duress would want these metrics for the performance gains. The system could set net.ipv4.tcp_no_metrics_save=1 to effectuate this change.

As a 4th example, to prevent "dropped packet" messages, the system could increase the maximum backlog by an order of magnitude. For example, multiplying the default backlog by 10 seems to alleviate this issue. For instance, the system could set net.core.netdev_max_backlog=10000 to effectuate this change. Such a resource setting can correspond to the length of the packet input queue.

As a 5th example, the incoming packet queue is generally very small by default, so raising this value to be equal with the backlog ensures the log will be cleared out fast, and the packets processed through as quickly as possible. This assumes a default of 128 sockets. The system could set net.core.somaxconn=10000 or an appropriate socket value to effectuate this change Such a resource setting can correspond the maximum number of backlogged packets (e.g., sockets). Backlogged packets are packets sitting and waiting to be processed by the server.

As a 6th example, increasing the number of available connections can help the server deal with a SYN flood. The default setting of 31,764 connections can be increased to a much larger and appropriate value, for example 2^19 available connections to keep even large SYN flood attacks at bay when combined with other changes. The system could set net.netfilter.nf_conntrack_max=524288, or an appropriate level of connections to effectuate this change.

As a 7th example, increasing the number of connections is a big help, but there may not be enough memory to accommodate the additional connections. There are three buffers to for handling TCP connections: the read, write, and internal buffers. These buffers are auto-calculated on boot and they are based on the total system memory size. The three buffer size variables are the following:
net.ipv4.tcp_mem low pressure high
net.ipv4.tcp_rmem low pressure high
net.ipv4.tcp_wmem low pressure high
Low, pressure and high are numerical values. Low is the normal amount of memory set aside for buffer activities. Pressure is when the TCP buffer is using this much memory, the kernel begins to put pressure on open sockets for them to close until usage falls below the low value. High is when the memory buffer has reached this size, packets will be dropped until the buffer usage shrinks below this value. Each value represents the number of memory pages allocated for each buffer and the buffers are dynamically re-sized as needed.

The server may have the setting of six megabytes for low, and 12 megabytes for pressure and 24 megabytes for high for one of the above parameters. As an example, that setting can be acceptable if you don't have a very popular server or a popular website at all. The pressure is at 12 megabytes, so the server will automatically allow more memory up to the 12 megabytes. Once it hits that pressure number of 12 megabytes, the server will try to close connections, in order to free up space. However, the server will allow the user of more memory up to the high of 24 megabytes. Once the server hits the 24 megabyte cap, no more connections will be permitted. Connections will be declined and closed, which is a problem that servers under attack experience. If an attack runs the server out of connection memory, then "Out of socket memory" errors will be experienced.

The auto adjustment mechanism of the system will review these values and just increase them dynamically when it detects that the limits are being reached. Likewise after an attack, the system can readjust the memory levels appropriately. As an example, a rule could be that once memory reaches 80% of the high level, then double the available memory.

As an 8th example, many modern operating systems set the page size to 4 kilobytes. The actual size can be verified using the command "getconf PAGE_SIZE." By and large, these values can be left alone, but there may be cases where "Out of socket memory" messages populate the logs and these values would have to be adjusted on a per case basis. There are many guides on the Internet which appear to be based on TCP "voodoo" with magical settings. Picking arbitrary numbers might actually cause more problems, so these values need to be adjusted with care. The system parameters are net.ipv4.tcp_mem, net.ipv4.tcp_rmem, and net.ipv4.tcp_wmem.

As a 9th example, the reuse of connections in a time wait state can reduce the impact of SYN floods. Even in high traffic sites, connections that have decayed into a time_wait state can be immediately reused for new connections. The system could set net.ipv4.tcp_tw_reuse=1 to effectuate this change.

As a 10th example, under severe SYN flood conditions, there is a possibility of filling up the time wait socket bucket. Generally the default value is sufficient; however, this value can be configured when needed. The system adjusting of set net.ipv4.tcp_tw_reuse=1 eliminates the need for modifying this setting in most cases. The adjustment is typically needed if messages like the following were found in the logs: "TCP: time wait bucket table overflow." The default is 65535 tw sockets. The system could adjust the value of net.ipv4.tcp_max_tw_buckets appropriately to effectuate this change.

As an 11th example, adjusting the system file descriptor limit provides more capacity to do work on the server, because all processes in Linux use file handles. A general heuristic is 256 handles per 4 megabytes of memory However, 4 GB has generally been sufficient, meaning setting fs.file-max=262144, from the operating system default of 65535 system-wide descriptors. This value could be further be adjusted as needed.

As a 12th example, when servers are very busy and suffer from port exhaustion, meaning that there are too many connections to the same backend server address, a fix is to increase the number of ports or create an additional proxy with a different source address. The default permits 28232 connections to the same address from the same address, that is from one machine to the server. If this count is exceeded, there will be connection problems. The default range is 32768 61000 (28232 ports). The max range is from 1024 to 65535, resulting in 64511 ports. The system could adjust the value of net.ipv4.ip_local_port_range=1024 65535 to effectuate this change.

As a 13th example, generally, running connection timeouts at 50% of the default values can be used, since it causes connections to close twice as fast. Under duress, these values can be modified as needed. The time spent waiting for ingress connection acknowledgement is a critical setting to evaluate under a SYN flood. Historically, under heavy flood, 9 to 15 seconds is sufficient. The higher that can be gotten away with and still maintain normal operations, the better to prevent trouble for legitimate users. The default ingress value is 60. The system could set net.netfilter.nf_conntrack_tcp_timeout_syn_recv=30 to effectuate this change. Since the local system is not sending DDoS traffic, leaving the egress default value is fine, but it can also be adjusted to 50% for consistency. The default value for egress is 120. The system could set net.netfilter.nf_conntrack_tcp_timeout_syn_sent=60 to effectuate this change.

This setting has to do with how TCP works. What can happen is a remote host will, initiate the TCP handshake, telling the server, "Hello, I'm here, want to connect?", sending a SYN. The server will respond with an ACK packet indicating that a connection will be accepted. Then the server will reserve a space in its memory for that incoming connection; even when the connection has not been established. However, when the remote machine is an attacker, they will not respond to the ACK, leaving the server waiting. This timeout adjusts that time between when the server ACK, and the permitted response time. By reducing this to as low a value as the server could possibly can and still not drop legitimate traffic, the server can mitigate DDoS attacks. This value should be adjusted dynamically, because people that are further away from the server or have high latency could suffer trying to connect if, if it is set too low. At the same time, during an attack, the value should be lowered to drop illegitimate connections from the attacker.

As a 14th example, The time that a connection should remain open, should be carefully adjusted. If it is too short, normal connections will drop too fast. For basic web page browsing the 180 second value is sufficient. This is an example of a variable that needs to be readjusted after an attack has completed, in order to resume normal operations. If the customer has applications such as chat or games that require long connection times this value should be increased. The default value is 432000. The system could set net.netfilter.nf_conntrack_tcp_timeout_established=180 to effectuate this change.

As a 15th example, in the first stage of closing a connection (fin-wait-1), the server is waiting for a remote connection termination request or the acknowledgement of a sent termination request. This can be adjusted downward under duress to >=5 seconds. The default is 120. The system could adjust net.netfilter.nf_conntrack_tcp_timeout_fin_wait=60 to effectuate this change.

As a 16th example, in the second stage of closing a connection (fin-wait-2), the system awaits a remote termination request. This can be adjusted downward under duress to >=5 seconds. The default value is 60. The system could set net.ipv4.tcp_fin_timeout=30 to effectuate this change.

As a 17th example, the system could reduce how long the server waits for the other end of the connection to acknowledge the connection termination request. This can be adjusted downward under duress to >=3 seconds. The default value is 10. The system could set net.netfilter.nf_conntrack_tcp_timeout_close=5 to effectuate this change.

As an 18th example, the system could reduce the time spent by the server waiting on acknowledgement of a termination request from a remote system to have the acknowledgement including the acknowledgements of termination requests from remote host. This can be adjusted downward under duress to >=3 seconds. The default value is 30. The system could set net.netfilter.nf_conntrack_tcp_timeout_last_ack=15 to effectuate this change.

As a 19th example, the system could reduce the time the server spends waiting to be sure the remote host received a connection termination request. This value does not need to be adjusted so long as tcp_tw_reuse or recycle is enabled. This setting is included for completeness though. The default value is 120. The system could set net.netfilter.nf_conntrack_tcp_timeout_time_wait=60 to effectuate this change.

For the timeout values, the system generally wants to lower them during an attack. A heuristic adjustment of around 50% of the default values during an attack can help mitigate, and then further adjustment if needed.

When an attack is no longer ongoing, the settings can be returned to default value, or decreased, potentially returning to the default setting.

V. Computer System

Any of the computer systems mentioned herein may utilize any suitable number of subsystems. Examples of such subsystems are shown in FIG. 2 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 2 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method of modifying settings of a server in response to an attack, the method comprising:
    monitoring client requests made to the server, the server having a first set of resources that are used to respond to client requests, each resource of the first set being capable of being increased and decreased, wherein an amount of a resource available for responding to the client requests is specified by a resource setting;
    determining a first amount of a first resource of the first set that is currently being used to respond to the client requests;
    comparing the first amount to a first threshold, the first threshold being less than a current value of a first resource setting corresponding to the first resource;
    in response to the first amount being larger than the first threshold, increasing a value of the first resource setting, thereby increasing the amount of the first resource available to respond to client requests;
    detecting an attack on the server; and
    changing a second resource setting for a second resource of a second set of resources, the second resource setting having two possible values.

2. The method of claim 1, wherein the first resource setting is a maximum amount of the first resource that is available.

3. The method of claim 1, further comprising:
    increasing the first threshold after the value of the first resource setting is increased.

4. The method of claim 2, wherein the first threshold is a specified percentage of the current value of the first resource setting.

5. The method of claim 2, wherein the first threshold is a specified number.

6. The method of claim 2, wherein the first resource corresponds to a number of connections available to client devices.

7. The method of claim 2, wherein the first resource corresponds to a number of backlog client requests that are stored at the server.

8. The method of claim 2, wherein the first resource corresponds to a number of connections that are allowed to be backlogged.

9. The method of claim 2, wherein the first resource corresponds to an amount of memory used to provide connections to client devices.

10. The method of claim 2, wherein the first resource corresponds to a number of ports available to client devices.

11. The method of claim 2, wherein the first resource corresponds to an amount of time before a connection to a client device times out.

12. The method of claim 1, wherein the first resource setting is increased by a specified percentage of the current value of the first resource setting.

13. The method of claim 1, wherein the first resource setting is increased by a specified number.

14. The method of claim 1, further comprising:
    increasing a second resource setting corresponding to a second resource in response to the first current amount being larger than the first threshold.

15. The method of claim 14, wherein the second resource setting is increased by a same amount that the first resource setting is increased.

16. The method of claim 1, wherein the first resource setting is a numerical value.

17. The method of claim 1, wherein the method is performed by the server, an external system, or a combination of both.

* * * * *